United States Patent
Seo et al.

(10) Patent No.: US 9,801,160 B2
(45) Date of Patent: Oct. 24, 2017

(54) METHOD FOR ALLOCATING REFERENCE SIGNALS OF A BACKHAUL LINK IN A RELAY COMMUNICATION SYSTEM, AND METHOD AND APPARATUS FOR TRANSMITTING/RECEIVING DATA USING THE SAME

(71) Applicant: LG ELECTRONICS INC., Seoul (KR)

(72) Inventors: Han-Byul Seo, Anyang (KR); Byoung-Hoon Kim, Anyang (KR)

(73) Assignee: LG Electronics Inc., Seoul (KR)

( * ) Notice: Subject to any disclaimer, the term of this patent is extended or adjusted under 35 U.S.C. 154(b) by 186 days.

(21) Appl. No.: 13/917,125

(22) Filed: Jun. 13, 2013

(65) Prior Publication Data

US 2013/0272188 A1   Oct. 17, 2013

Related U.S. Application Data

(63) Continuation of application No. 13/202,537, filed as application No. PCT/KR2010/001045 on Feb. 19, 2010, now Pat. No. 8,565,184.

(Continued)

(51) Int. Cl.
*H04W 72/04* (2009.01)
*H04B 7/155* (2006.01)
*H04L 5/00* (2006.01)

(52) U.S. Cl.
CPC ........ *H04W 72/04* (2013.01); *H04B 7/15557* (2013.01); *H04L 5/0048* (2013.01); *H04L 5/0044* (2013.01)

(58) Field of Classification Search
CPC .. H04B 7/15; H04B 7/15507; H04B 7/15557; H04L 5/0023; H04L 5/0051;

(Continued)

(56) References Cited

U.S. PATENT DOCUMENTS

2008/0008276 A1* 1/2008 Yokoyama ............. H04B 7/063
   375/347
2009/0135803 A1* 5/2009 Luo et al. .................... 370/350
(Continued)

FOREIGN PATENT DOCUMENTS

JP   2006-101019 A   4/2006
JP   2007-295569 A   11/2007
(Continued)

OTHER PUBLICATIONS

Motorola, "LTE signaling to support Relay Operation", R1-084412, 3GPP TSG RAN WG1 Meeting #55, Nov. 10-14, 2008.*

(Continued)

*Primary Examiner* — Khoa Huynh
(74) *Attorney, Agent, or Firm* — Birch, Stewart, Kolasch & Birch, LLP (57) ABSTRACT

The present invention relates to a method and to an apparatus for transmitting/receiving data in a relay communication system. The method comprises the steps of: setting, as a guard band, the first predetermined number of symbol transmission slots of a data transmission period in a subframe resource element of a downlink channel constituted by a control signal transmission period to which a control signal is allocated and the data transmission period to which downlink data is allocated; allocating reference signals to symbols of the data transmission period; puncturing the symbols corresponding to the guard band from among the symbols to which said reference signals are allocated; and transmitting signals to which said reference signals are allocated.

2 Claims, 10 Drawing Sheets

BACKHAUL SIGNAL REGION

Related U.S. Application Data (60) Provisional application No. 61/153,979, filed on Feb. 20, 2009.

(58) Field of Classification Search
CPC ............. H04L 25/0224; H04L 25/0226; H04L 27/261; H04L 27/2611; H04L 27/2613; H04L 27/28; H04L 5/0044; H04L 5/0048; H04W 72/04; H04W 72/0406; H04W 72/042; H04W 72/0426; H04W 72/0446
See application file for complete search history.

(56) References Cited

U.S. PATENT DOCUMENTS

| | | | |
|---|---|---|---|
| 2009/0185632 A1* | 7/2009 | Cai et al. ....................... | 375/260 |
| 2010/0080139 A1 | 4/2010 | Palanki et al. | |
| 2010/0157875 A1* | 6/2010 | Li ........................ | H04B 7/2615 |
| | | | 370/315 |
| 2010/0322100 A1 | 12/2010 | Wan et al. | |
| 2011/0170475 A1* | 7/2011 | Raaf ................. | H04B 7/15542 |
| | | | 370/315 |
| 2011/0243107 A1 | 10/2011 | Koivisto et al. | |

FOREIGN PATENT DOCUMENTS

| | | |
|---|---|---|
| WO | WO 2004/056029 A2 | 7/2004 |
| WO | WO 2007/053954 A1 | 5/2007 |
| WO | WO 2008/069555 A1 | 6/2008 |
| WO | WO 2008/127185 A1 | 10/2008 |

OTHER PUBLICATIONS

Ericsson, "Self Backhauling and Tower Layer Relaying," TSG-RAN WG1 #63 bis, Agenda Item 12, R1-082470, Jun. 30-Jul. 4, 2008, Warsaw, 3 pages.

LTE Rapporteur (NTT DoCoMo), "Text Proposal for Stage 2 TS," 3GPP TSG RAN WG1 Meeting #48, Agenda Item 6.1, R1-070753, Feb. 12-16, 2007, St. Louis, USA, 14 pages.

LG Electronics, "Comparison of in-band relaying methods in FDD mode," 3GPP TSG RAN WG1 Meeting #56, R1-090664, Athens, Greece, Feb. 9-13, 2009, pp. 1-7.

LG Electronics, "Consideration on Resource Allocation for Relay Backhaul Link," 3GPP TSG RAN WG1 Meeting #56, R1-090790, Athens, Greece, Feb. 9-13, 2009, 5 pages.

Motorola, "Frame Structure and Signaling to Support Relay Operation," 3GPP TSG RAN1 #56, R1-090798, Athens, Greece, Feb. 9-13, 2009, 3 pages.

LG Electronics, "Consideration on Resource Allocation for Relay Backhaul Link," 3GPP TSG RAN WG1 Meeting #55bis, R1-090222, Ljubljana, Slovenia, Jan. 12-16, 2009, 5 pgs.

LG Electronics, "UL subframe stealing for in-band relaying in TDD mode," 3GPP TSG RAN WG1 Meeting #56, R1-090665, Athens, Greece, Feb. 9-13, 2009, pp. 1-6.

LG-Nortel, "Requirements and Configurations of Relay in Various Environments," 3GPP TSG RAN WG1 Meeting #56, R1-090566, Athens, Greece, Feb. 9-13, 2009, 12 pgs.

Qualcomm Europe, "Comparing Relay Support with MBSFN and Blank Subframes," 3GPP TSG RAN WG1 #55 Meeting, R1-084515, Prague, Czech Republic, Nov. 10-14, 2008, 4 pgs.

CMCC, "Text proposal eNB-to-Relay backhaul," TSG-RAN WG1 Meeting #56, R1-091832, Seoul, Korea, Feb. 9-13, 2009, 2 pages.

CMCC, Text proposal for TR36.814 on Relay backhaul, TSG-RAN WG1 Meeting #56, R1-091565, Seoul, Korea, Feb. 9-13, 2009, 2 pages.

* cited by examiner

▨ BACKHAUL REFERENCE SIGNAL
☐ BACKHAUL DATA SIGNAL

▨ BACKHAUL REFERENCE SIGNAL
☐ BACKHAUL DATA SIGNAL

▨ BACKHAUL REFERENCE SIGNAL
☐ BACKHAUL DATA SIGNAL

METHOD FOR ALLOCATING REFERENCE
SIGNALS OF A BACKHAUL LINK IN A
RELAY COMMUNICATION SYSTEM, AND
METHOD AND APPARATUS FOR
TRANSMITTING/RECEIVING DATA USING
THE SAME

CROSS REFERENCE TO RELATED APPLICATIONS

This Application is a Continuation of co-pending application Ser. No. 13/202,537 filed Aug. 19, 2011, which is the National Phase of PCT/KR2010/001045 filed on Feb. 19, 2010, which claims priority under 35 U.S.C. 119(e) to U.S. Provisional Application No. 61/153,979 filed on Feb. 20, 2009. The entire contents of all the above applications are hereby incorporated by reference.

TECHNICAL FIELD

The present invention relates to a method and apparatus for transmitting/receiving data in a relay communication system, and more particularly, to a method and apparatus for allocating reference signals of backhaul link resources and effectively measuring the reference signals.

BACKGROUND ART

According to the recent trend, a radio communication system has an increased service frequency band, and cells having decreased radiuses for high speed data communications and increased telephone traffic. This may cause many problems when applying the existing centralized cellular radio network method as it is. More concretely, a configuration of a radio link has a degraded flexibility due to a fixed location of a base station. This may cause a difficulty in providing efficient communication services in a radio environment where traffic distributions or requested telephone traffic are severely changed.

In order to solve these problems, the next generation radio communication system referred to as LTE-Advanced (Long Term Evolution Advanced) system or E-UTRA (Evolved Universal Terrestrial Radio Access) considers a Multi-Hop relay system. This multi-hop relay system has the following advantages. Firstly, a cell service area may be increased by covering partial shadow areas occurring inside a cell area, and a system capacity may be increased. Furthermore, an initial situation requiring less service is implemented by using a relay. This may reduce the initial installation costs.

In the relay system, a communication channel between a base station and a terminal may be implemented through a direct connection therebetween, or may be implemented in the Ruin of a relay node (RN). Here, the communication channel formed between the base station and the RN is called 'backhaul' link.

A communication method through the backhaul link channel may be categorized into an 'in-band backhaul' method and an 'out-band backhaul' method. The in-band backhaul method indicates a method for dynamically sharing frequency resources between a backhaul communication and a terminal communication. On the other hand, the out-band backhaul method indicates a method for separately using frequency resources between a backhaul communication and a terminal communication.

When transmitting a backhaul signal through a backhaul link, propagation delay occurs according to a communication environment, etc. Since a backhaul signal transmitted through a backhaul link is generally designed with consideration of propagation delay, available resources of a backhaul link channel may not be fixed but variable according to a communication environment.

More concretely, in a communication environment where propagation delay is great, the amount of resources available as a backhaul signal is reduced. On the other hand, in a communication environment where propagation delay is less, the amount of resources available as a backhaul signal is increased.

In this case, a reference signal included in the backhaul signal needs to be designed so as to be changeable according to the amount of the resources available as the backhaul signal.

DISCLOSURE OF THE INVENTION

Therefore, an object of the present invention is to provide a method for allocating a reference signal of a backhaul signal capable of effectively using a reference signal even if the amount of resources available as a backhaul signal, and a method for transmitting data using the same.

To achieve these and other advantages and in accordance with the purpose of the present invention, as embodied and broadly described herein, there is provided a method for transmitting data in a method for transmitting and receiving data in a relay communication system, the method comprising: setting, as a guard band, the first predetermined number of symbol transmission slots of a data transmission period in a subframe resource element of a downlink channel constituted with a control signal transmission period to which a control signal is allocated and the data transmission period to which downlink data is allocated; allocating reference signals to symbols of the data transmission period; puncturing the symbols corresponding to the guard band from the symbols to which the reference signals have been allocated; and transmitting signals to which the reference signals have been allocated, wherein a relay node (RN) having received the signals to which the reference signals have been allocated executes channel estimation except for the punctured reference signals.

Preferably, the guard band may consist of one to four symbols, and may be a period where the RN executes a mode conversion from a transmission mode to a reception mode.

Preferably, the last one to four symbols of the data transmission period may be set as an additional guard band, and the additional guard band may be a section where the RN executes a mode conversion from a reception mode to a transmission mode.

Preferably, the subframe may be an MBSFN (Multicast Broadcast Single Frequency Network) subframe where the RN receives a backhaul signal from a base station.

Preferably, the subframe may further include an uplink signal reception period, and may be a special subframe disposed between a downlink subframe and an uplink subframe, and configured to transmit a downlink signal during the data transmission period, and to receive an uplink signal during the uplink signal reception period.

Preferably, the reference signal may be a Common Reference Signal (CRS) for acquiring information on a channel status, or a Dedicated Reference Signal (DRS) for demodulating a transmission signal.

According to another embodiment of the present invention, there is provided a method for transmitting data in a method for transmitting and receiving data in a relay communication system, the method comprising: setting, as a guard band, the first predetermined number of symbol transmission slots of a data transmission period in a subframe resource element of a downlink channel constituted with a control signal transmission period to which a control signal is allocated and the data transmission period to which downlink data is allocated; determining symbols to which reference signals are to be allocated with respect to the subframe resource element; allocating the reference signals to symbols of the data transmission period except for the guard band; and transmitting signals to which the reference signals have been allocated.

Preferably, the guard band may consist of one to four symbols, and may be a period where a relay node (RN) executes a mode conversion from a transmission mode to a reception mode.

Preferably, the last one to four symbols of the data transmission period may be set as an additional guard band, and the additional guard band may be a period where the RN executes a mode conversion from a reception mode to a transmission mode.

Preferably, the subframe may be an MBSFN (Multicast Broadcast Single Frequency Network) subframe where the RN receives a backhaul signal from a base station.

Preferably, the subframe may further include an uplink signal reception period, and may be a special subframe disposed between a downlink subframe and an uplink subframe, and configured to transmit a downlink signal during the data transmission period, and to receive an uplink signal during the uplink signal reception period.

Preferably, the reference signal may be a Common Reference Signal (CRS) for acquiring information on a channel status, or a Dedicated Reference Signal (DRS) for demodulating a transmission signal.

To achieve these and other advantages and in accordance with the purpose of the present invention, as embodied and broadly described herein, there is also provided an apparatus for transmitting data in an apparatus for transmitting and receiving data in a relay communication system, the apparatus comprising: a reference signal allocating unit configured to set, as a guard band, the first predetermined number of symbol transmission slots of a data transmission period in a subframe resource element of a downlink channel constituted with a control signal transmission period to which a control signal is allocated and the data transmission period to which downlink data is allocated, and configured to allocate reference signals to symbols of the data transmission period; a puncturing unit configured to puncture the symbols corresponding to the guard band from the symbols to which the reference signals have been allocated; and a transmitter configured to transmit signals to which the reference signals have been allocated.

Preferably, the guard band may consist of one to four symbols, and may be a period where a relay node (RN) executes a mode conversion from a transmission mode to a reception mode.

Preferably, the last one to four symbols of the data transmission period may be set as an additional guard band, and the additional guard band may be a period where the RN executes a mode conversion from a reception mode to a transmission mode.

Preferably, the subframe may be an MBSFN (Multicast Broadcast Single Frequency Network) subframe where the RN receives a backhaul signal from a base station.

Preferably, the subframe may further include an uplink signal reception period, and may be a special subframe disposed between a downlink subframe and an uplink subframe, and configured to transmit a downlink signal during the data transmission period, and to receive an uplink signal during the uplink signal reception period.

Preferably, the reference signal may be a Common Reference Signal (CRS) for acquiring information on a channel status, or a Dedicated Reference Signal (DRS) for demodulating a transmission signal.

In the present invention, even if resources available as a backhaul signal are changed due to propagation delay, a backhaul reference signal may be transmitted after being changed according to the amount of the resources available as a backhaul signal.

Furthermore, since a receiver receives backhaul signals to which reference signals have been allocated, channel estimation and data demodulation may be executed more effectively.

MODES FOR CARRYING OUT THE PREFERRED EMBODIMENTS

Hereinafter, preferred embodiments of the present invention will be explained in more details with reference to the attached drawings. Wherever possible, the same reference numerals will be used through the drawings to refer to the same or similar parts, and the same descriptions thereof are omitted. However, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

A communication system of the present invention is a system for providing various communication services such as voice and packet data, and includes a base station, a relay and a terminal. The communication system will be explained with taking a Long Term Evolution (LTE) system or an LTE-Advanced system as a representative example.

The terminal of the present invention may be referred to as a Subscriber Station (SS), a User Equipment (UE), a Mobile Equipment (ME), a Mobile Station (MS), etc., and includes a portable device having a communication function such as a portable phone, a PDA, a smart phone and a notebook, or an unportable device such as a PC and a vehicle-mounted device.

The relay node may be referred to as a relay, RS (Relay Station), etc., and is installed between a base station and a terminal to relay a transmitted or received signal. This relay node covers partial shadow areas occurring inside a cell area, extends a cell service area, and increases a system capacity. The relay node may be implemented as a multi-hop for effectively relaying data traffic occurring between the base station and the terminal. Alternatively, the relay node may be fixed to one position or may have mobility.

The base station of the present invention indicates a fixed point communicated with a terminal, which may be referred to as an eNB (evolved-NodeB), a BTS (Base Transceiver System), an AP (Access Point), etc. One base station may have one or more cells, and an interface for transmission of a user traffic or a control traffic may be used between base stations. A downlink indicates a communication channel from the base station to the terminal, and an uplink indicates a communication channel from the terminal to the base station.

A multiple access technique applied to a wireless communications system of the present invention may include CDMA (Code Division Multiple Access), TDMA (Time Division Multiple Access), FDMA (Frequency Division Multiple Access), SC-FDMA (Single Carrier-FDMA), OFDMA (Orthogonal Frequency Division Multiple Access), or well-known other modulation techniques.

A multiple access scheme for downlink transmission may be different from a multiple access scheme for uplink transmission. For instance, an OFDMA scheme may be used for downlink transmission, whereas an SC-FDMA scheme may be used for uplink transmission.

Hereinafter, preferred embodiments of the present invention will be explained in more details with reference to the attached drawings. Wherever possible, the same reference numerals will be used through the drawings to refer to the same or similar parts, and the same descriptions thereof are omitted.

Figure 1:
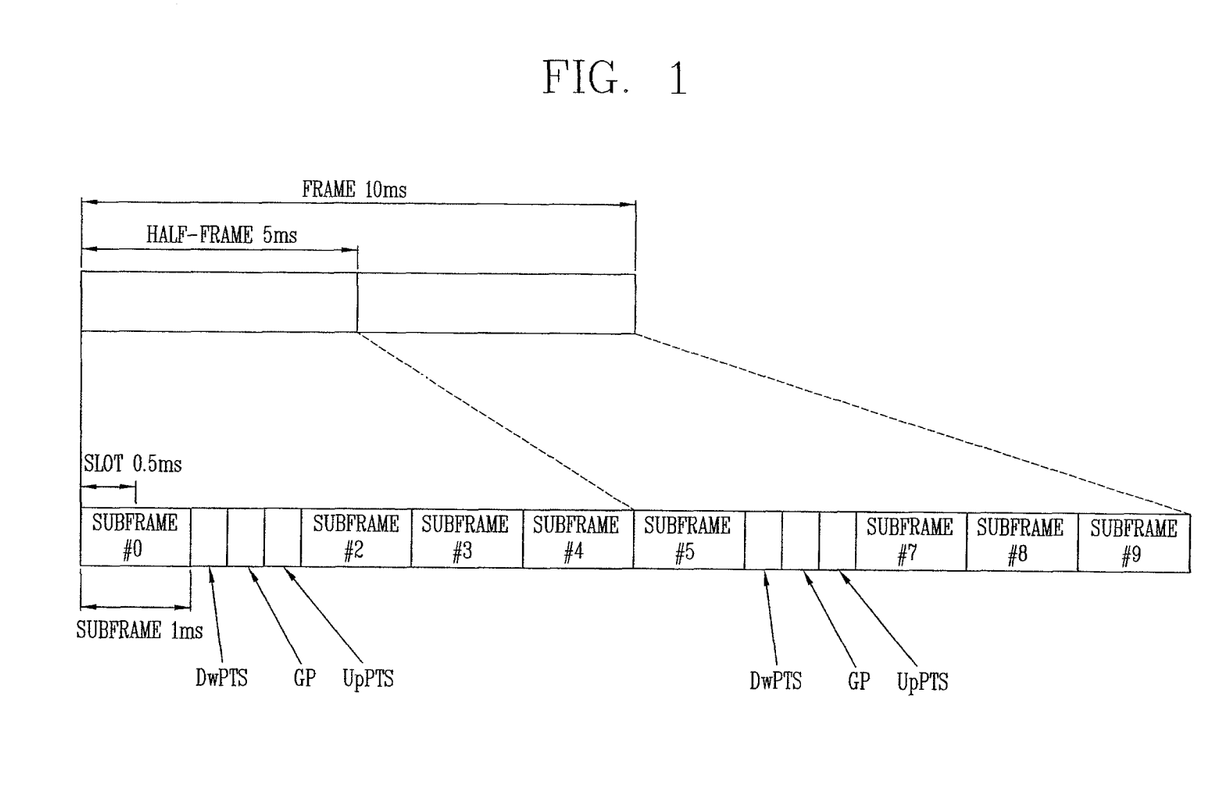
FIG. 1 is a view illustrating a TDD frame structure of a 3GPP LTE system.

FIG. 1 is a view illustrating a TDD frame structure of a 3GPP LTE system.

Referring to FIG. 1, a frame of a 3GPP LTE system consists of ten subframes (subframe #0 subframe #9). These subframes may consist of 7 OFDM (orthogonal frequency division multiplexing) symbols in a normal cyclic prefix (CP), and may consist of six OFDM symbols in an extended cyclic prefix.

A special subframe is disposed at a switching point between a downlink transmission and an uplink transmission. Especially, switching to a downlink transmission from an uplink transmission corresponds to a mere intra-cell switching. On the other hand, switching to an uplink transmission from a downlink transmission requires the special subframe at a switching point to an uplink transmission from a downlink transmission, since a downlink transmission of a high power from a base station may disturb an uplink reception of a neighboring base station.

The special subframe consists of DwPTS (downlink pilot time slot), GP (guard period) and UpPTS (uplink pilot time slot). The special subframe may consist of 1 ms or less than. The GP is a period for timing advance to cover a time duration for switching of a hardware, and to compensate for propagation delay between a base station and a terminal. Especially, this GP is used as a guard period for removing an interference occurring at an uplink due to multiple-path delay of a downlink signal. The DwPTS is a downlink transmission period of control information and data, which may be regarded as a general downlink subframe. Especially, the DwPTS is used to search for an initial cell and to execute synchronization or channel estimation. The UpPTS is an uplink transmission period. Especially, this UpPTS is used to transmit an SRS (sounding reference signal) for channel estimation at a base station, and to transmit a random access channel (RACH) for synchronization of a terminal's uplink transmission.

The following table 1 illustrates a configurable frame structure according to arrangements of an uplink subframe and a downlink subframe in a TDD mode of a 3GPP LTE system. In the table 1, 'D' indicates a downlink subframe, 'U' indicates an uplink subframe and 'S' indicates a special subframe.

TABLE 1

| | | Uplink-downlink | | | | | | | | | |
|---|---|---|---|---|---|---|---|---|---|---|---|
| Configu-ration | Downlink-to-Uplink Switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in the table 1, there are 7 configurable arrangements of a TDD subframe, configurations 0~2, 6 are converted to an uplink from a downlink with a period of 5 ms, and configurations 3~5 are converted to an uplink from a downlink with a period of 10 ms, And, there is a special subframe at a switching point to an uplink from a downlink.

The following table 2 illustrates a configurable structure of a special subframe in a 3GPP LTE system. As aforementioned, the special subframe consists of DwPTS, GP and UpPTS. In the table 2, '$T_s$' indicates a basic time unit or sampling time, and is defined as $1/(15000*2048)$ (seconds). Nine combinations may be implemented in case of a normal cyclic prefix (CP), and 7 combinations may be implemented in case of an extended cyclic prefix.

TABLE 2

| Special subframe configuration | Normal cyclic prefix | | | Extended cyclic prefix | | |
| --- | --- | --- | --- | --- | --- | --- |
| | DwPTS | GP | UpPTS | DwPTS | GP | UpPTS |
| 0 | $6592 \cdot T_s$ | $21936 \cdot T_s$ | $2192 \cdot T_s$ | $7680 \cdot T_s$ | $20480 \cdot T_s$ | $2560 \cdot T_s$ |
| 1 | $19760 \cdot T_s$ | $8768 \cdot T_s$ | | $20480 \cdot T_s$ | $7680 \cdot T_s$ | |
| 2 | $21952 \cdot T_s$ | $6576 \cdot T_s$ | | $23040 \cdot T_s$ | $5120 \cdot T_s$ | |
| 3 | $24144 \cdot T_s$ | $4384 \cdot T_s$ | | $25600 \cdot T_s$ | $2560 \cdot T_s$ | |
| 4 | $26336 \cdot T_s$ | $2192 \cdot T_s$ | | $7680 \cdot T_s$ | $17920 \cdot T_s$ | $5120 \cdot T_s$ |
| 5 | $6592 \cdot T_s$ | $19744 \cdot T_s$ | $4384 \cdot T_s$ | $20480 \cdot T_s$ | $5120 \cdot T_s$ | |
| 6 | $19760 \cdot T_s$ | $6576 \cdot T_s$ | | $23040 \cdot T_s$ | $2560 \cdot T_s$ | |
| 7 | $21952 \cdot T_s$ | $4384 \cdot T_s$ | | — | — | — |
| 8 | $24144 \cdot T_s$ | $2192 \cdot T_s$ | | — | — | — |

Figure 2:
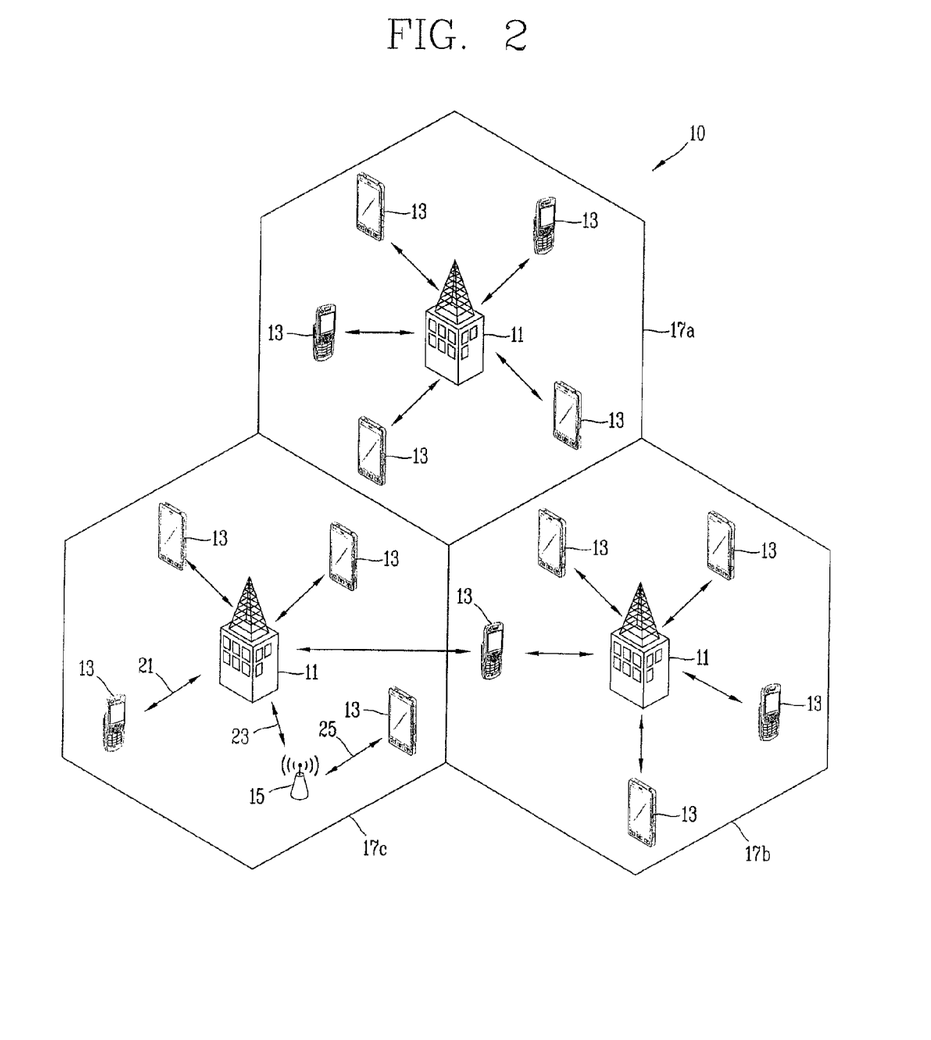
FIG. 2 is a conceptual diagram to explain a radio relay communication system to which the present invention may be applied.

FIG. 2 is a conceptual diagram to explain a radio relay communication system to which the present invention may be applied.

As shown in FIG. 2, a radio communication system 10 includes one or more base stations 11. Each base station 11 may provide a communication service with respect to one or more cells 17a, 17b and 17c, and each cell 17a, 17b and 17c may consist of a plurality of sectors (not shown). A terminal 13 may communicate with one or more base stations 11.

The base station 11 may form a communication channel with the terminal 13 through a direct link 21, or through links 23 and 25 via a relay node 15. Here, a channel 23 formed between the base station 11 and the relay node 17, especially, a downlink channel is referred to as a backhaul link. For instance, in a 3GPP LTE system, the backhaul link 23 may include R-PDSCH (Relay Physical Downlink Shared Channel) through which data is transferred to the relay node 15 from the base station 11, and R-PDCCH (Relay Physical Downlink Control Channel) through which control information is transferred to the relay node 15 from the base station 11.

Generally, it is assumed that the relay node 15 cannot simultaneous execute reception and transmission in the same frequency band. The reason is as follows. If the relay node 15 simultaneously supports reception and transmission, an operation of high complexity is required to increase the installation costs.

Accordingly, the relay node 15 cannot transmit a downlink signal to terminals 14 connected thereto while receiving a signal of the backhaul link 23 from the base station 11. If the downlink signal 25 to be transmitted to the terminals 14 from the relay node 15 is blanked, the terminals 14 cannot normally receive a pilot signal or a reference signal included in the downlink signal 25.

The pilot signal or the reference signal is a preset transmission signal notified to a transmission side and a reception side, which is used to check a distorted degree of a transmission signal when the transmission signal is transmitted to the reception side from the transmission side through a transmission channel. Generally, the reference signal is used to acquire channel information and/or to execute data demodulation. This reference signal includes a Cell-specific reference signal (common reference signal; CRS) shared by all terminals inside a cell, and a Dedicated reference signal (DRS) for a specific terminal.

The CRS is used to acquire information on a channel status, to measure a handover, etc. The terminal may measure the CRS, and inform the base station 11 or the relay node 15 of feedback information such as CQI (Channel Quality Information), PMI (Precoding Matrix Indicator) and RI (Rank Indicator). And, the base station 11 or the relay node 15 may execute a scheduling of a downlink frequency region based on the feedback information received from the terminals 14.

Generally, the terminals 14 expect reference signals in subframes of all the downlinks 25. Accordingly, the relay node 15 which is to receive a signal of the backhaul link 23 from the base station 11 should inform the terminals 14 connected thereto that a signal of the downlink 25 is to be blanked. If the relay node 15 receives a backhaul signal without this notification, the terminals 14 expect reference signals of in subframes of all the downlinks 25. This may cause a channel measurement at the terminals to be severely deteriorated.

In order to solve the aforementioned problems, may be considered a method for implementing a subframe to receive a backhaul signal by the relay node 15 from the base station, as an MBSFN (multicast broadcast single frequency network) subframe or a special subframe.

Figure 3:
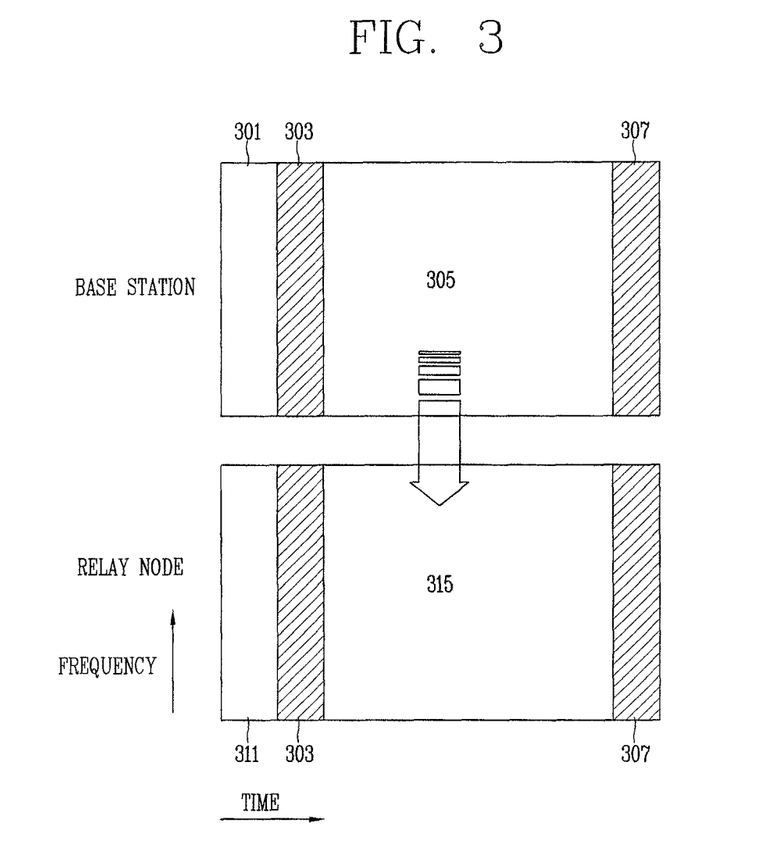
FIG. 3 is a view illustrating a backhaul link signal structure using an MBSFN subframe.

FIG. 3 is a view illustrating a backhaul link signal structure using an MBSFN subframe.

The backhaul link signal using an MBSFN subframe transmitted from the base station includes a control channel transmission period 301, a backhaul signal transmission period 305 and guard periods 303 and 307.

The control channel transmission period 301 is a PDCCH period where control signals of the terminals 14 directly connected to the base station 11 through a link are transmitted, which may consist of at least one to four OFDM symbol transmission slots. The relay node 15 transmits control signals to the terminals 14 connected thereto during the control channel transmission period 301 of the base station 11. As shown, a control signal transmission period 311 of the relay node 15 is made up of at least one to four OFDM symbol transmission periods.

Between the control channel transmission period 301 and the backhaul signal transmission period 305, there is a guard period 303 corresponding to a transition gap for conversion of a mode of the relay node 15 to a reception mode (Rx) from a transmission mode (Tx). In some cases, the base station may transmit a garbage signal during the guard period 301. Here, the garbage signal may indicate an arbitrary signal transmitted from the base station, or an arbitrary signal detected when the base station is in a standby state without transmitting a special signal in a state that power of a transmitter has not turned OFF. The time when the base station transmits a garbage signal may be recognized as a guard period in the aspect of the relay node. Likewise, a guard period 307 corresponding to a transition gap for mode conversion of the relay node 15 to a transmission mode (Tx) from a reception mode (Rx) is positioned behind the backhaul signal transmission period 305.

Therefore, the relay node 15 cannot receive or transmit a signal on symbols of the guard periods 303 and 307 corresponding to a transition gap. Accordingly, a signal which should be received by the relay node 15 has to be transmitted on symbols of a transition-completed period, not symbols of a period where transition is being executed. This may cause a restriction in the number of symbols of a subframe which can be substantially used as a backhaul in a backhaul link subframe by the relay node 15.

According to a backhaul design scheme, a subframe transmitted as a backhaul link may be divided into variable sections 303 and 307 where a signal cannot be received by the relay node, and a fixed section 303 where a signal can be received by the relay node 15. As shown, the variable sections 303 and 307 may include symbols corresponding to a guard time of the control signal transmission period 311 of the relay node, and the transition period 303 for a mode conversion to a reception mode from a transmission mode, or the transition period 307 for a mode conversion to a transmission mode from a reception mode.

Both or one of the variable sections 303 and 307 may be implemented according to a backhaul design method. For instance, the variable sections 303 and 307 may be omitted according to a timing design of the transition period 307 for a mode conversion to a transmission mode from a reception mode of the relay node 15.

The backhaul signal transmission period 305 indicates a period to which a backhaul downlink signal of the relay node 15 is transmitted. The relay node 15 receives a backhaul signal from the base station 11 during the backhaul signal transmission period 305. Here, the terminals 14 connected to the relay node 15 come to know that there is no downlink signal transmitted thereto, thereby not executing a reference signal measurement with respect to an MBSFN subframe. Accordingly, the relay node 15 may stop transmitting the backhaul signal to the terminals 14, without causing the conventional measurement problem occurring on the terminals 14, and receive a backhaul signal by setting the MBSFN subframe as a reception subframe.

Figure 4:
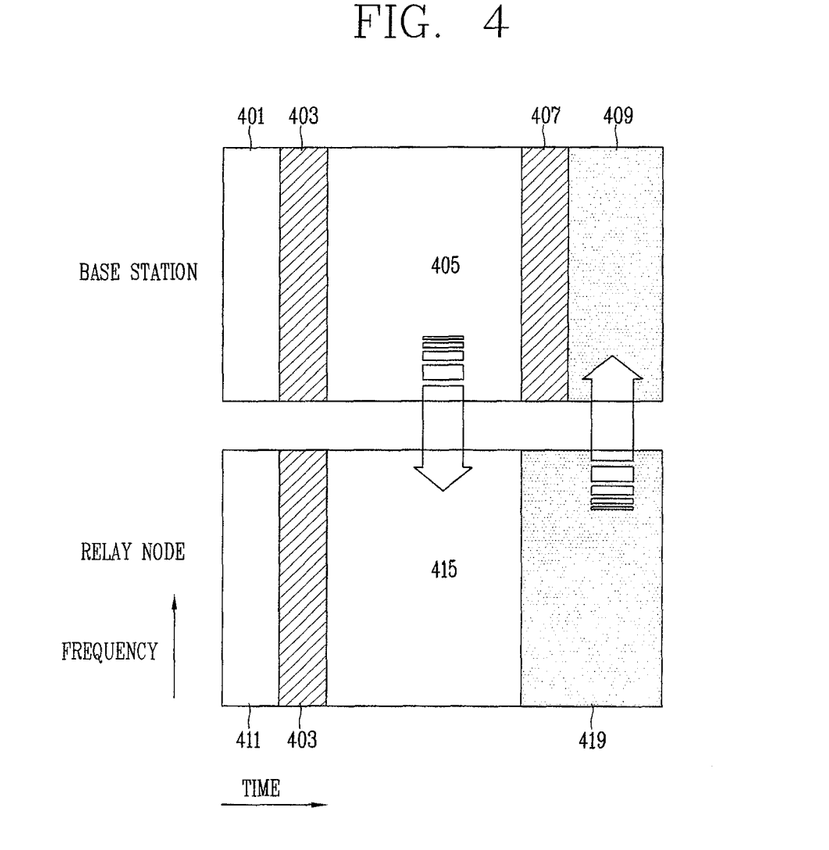
FIG. 4 is a view illustrating a backhaul link signal structure using a special subframe.

FIGS. 4A-4B are views illustrating a backhaul link signal structure using a special subframe.

As aforementioned with reference to FIG. 1, the special subframe consists of a DwPTS 401, GPs (guard periods) 403 and 407, a backhaul signal region 405 and an UpPTS 409.

Firstly, the base station transmits a downlink signal to the terminals at the DwPTS 401. The relay node may also transmit a downlink signal to the terminals at a DwPTS 411.

Then, while the relay node executes a mode conversion between a transmission mode and a reception mode during the GP 403, the base station transmits a garbage signal for a time duration corresponding to the GP 403.

Then, the base station transmits a backhaul signal 405 to the relay node corresponding to relay node period 415 until it reaches the GP 407. The GP 407 indicates a guard period where the base station prepares to receive an uplink signal 419 from the terminal or the relay node in a reception mode. Then, the base station receives an uplink signal 419 from the terminal or the relay node at the UpPTS 409.

In case of a backhaul link signal of a special subframe structure, the terminals 13 and 14 expect a CRS at a DwPTS, but do not execute a CRS measurement at the rest parts (GP, UpPTS). Therefore, it is possible for the base station 11 to transmit backhaul data to the relay node 15 with including the backhaul data in the GP and the UpPTS.

In the MBSFN subframe and the special subframe explained with reference to FIGS. 3 and 4A-4B, the backhaul signal transmission periods 305 and 405 where the relay node 15 can receive a signal may be variable according to communication environments due to the guard periods.

For instance, in a communication environment having great propagation delay, the guard period is set to have a relatively longer length so as to compensate for the propagation delay. This may reduce the amount of resources available as a backhaul signal. On the other hand, in a communication environment having less propagation delay, the guard period is set to have a relatively shorter length. This may increase the amount of resources available as a backhaul signal.

The present invention proposes a method for designing a backhaul reference signal capable of preventing performance degradation of a reception side when resources available as a backhaul signal are changed.

FIGS. 5A, 5B, 6A, 6B, 7A and 7B are views each illustrating an embodiment where a backhaul reference signal is allocated to a fixed position.

Figure 5A:
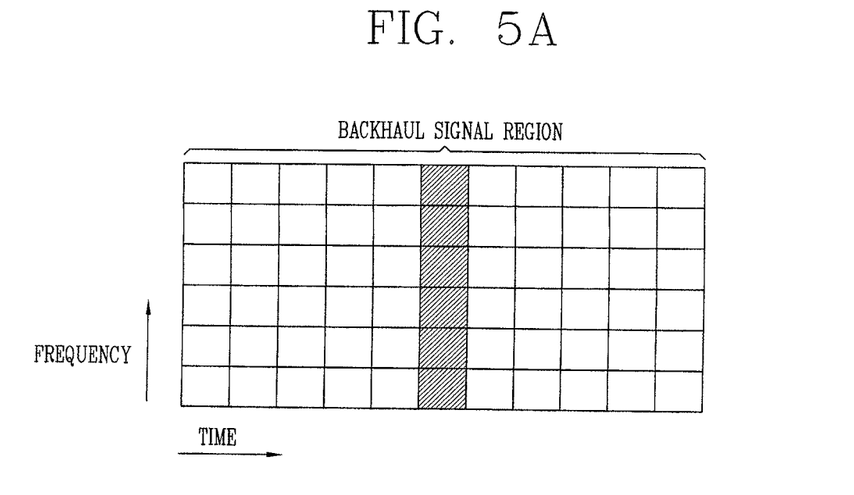
FIGS. 5A-5B are views illustrating a backhaul link signal structure in which a backhaul reference signal is allocated according to one embodiment of the present invention.
Figure 5B:
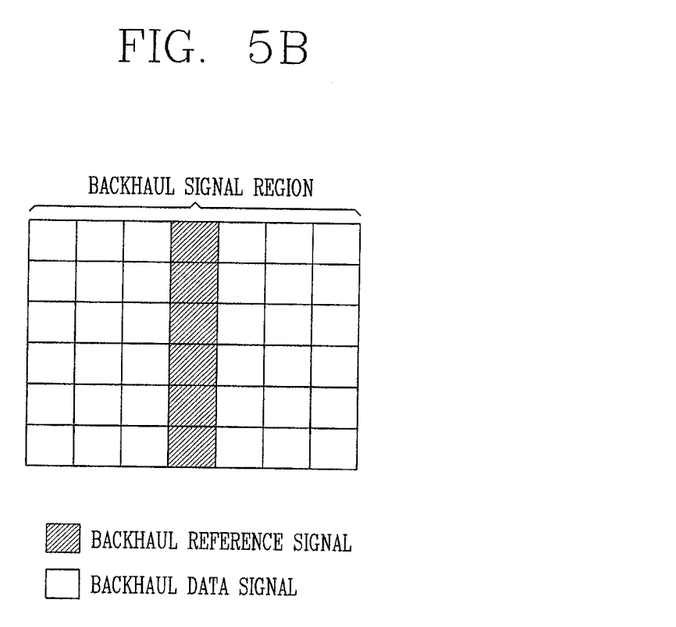

As shown in FIGS. 5A-5B, a backhaul reference signal (RS) may be allocated to a fixed position at the center of a backhaul signal region. Referring to FIG. 5A, the number of OFDM symbols which can be allocated to a backhaul signal region is 11. Referring to FIG. 5B, the number of OFDM symbols which can be allocated to a backhaul signal region is 7. As shown in FIG. 5, the reference signal positioned at the center of the entire data region may be a Physical Uplink Shared Channel (PUSCH), or may be a Common Reference Signal (CRS) for acquiring information on a channel status, or/and a Dedicated Reference Signal (DRS) for demodulating a transmission signal.

FIGS. 6A, 6B, 7A and 7B are views illustrating a backhaul link signal structure in which a backhaul reference signal is allocated to a fixed position according to other embodiments of the present invention.

Figure 6A:
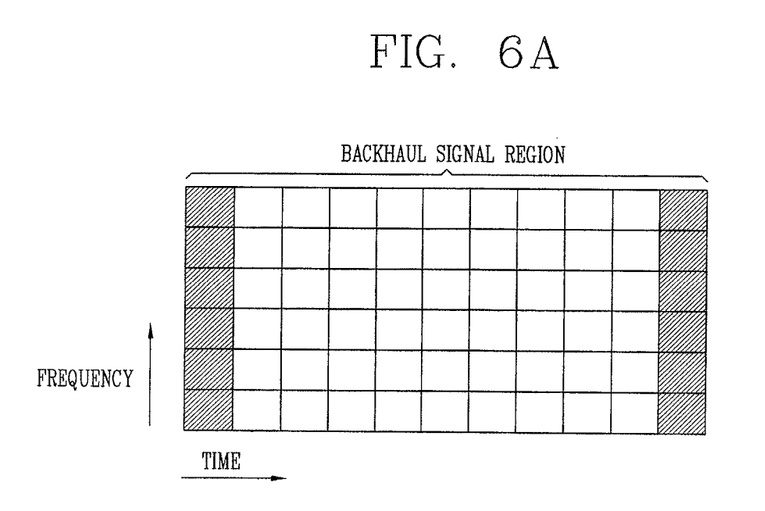
FIG. 6A-6B are views illustrating a backhaul link signal structure in which a backhaul reference signal is allocated according to another embodiment of the present invention.
Figure 6B:
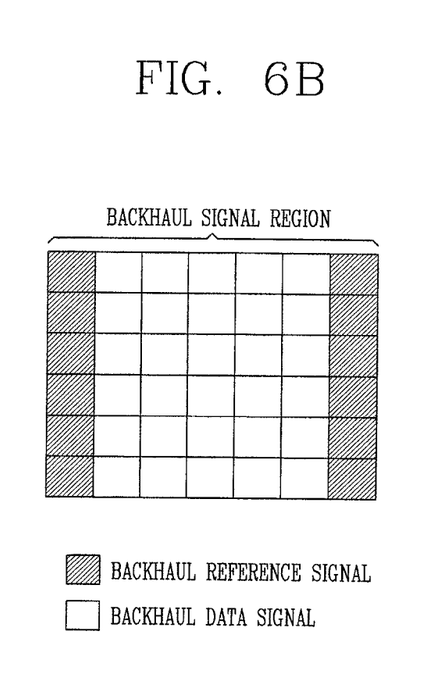
Figure 7A:
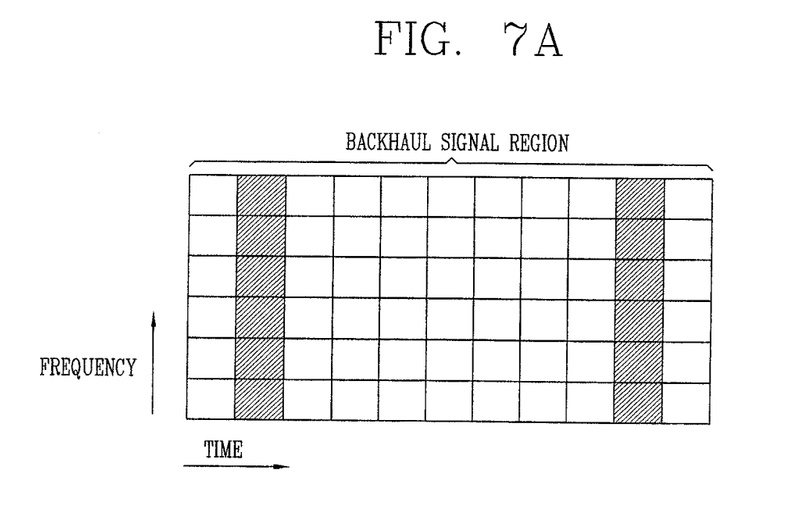
FIGS. 7A-7B are views illustrating a backhaul link signal structure in which a backhaul reference signal is allocated according to still another embodiment of the present invention.
Figure 7B:
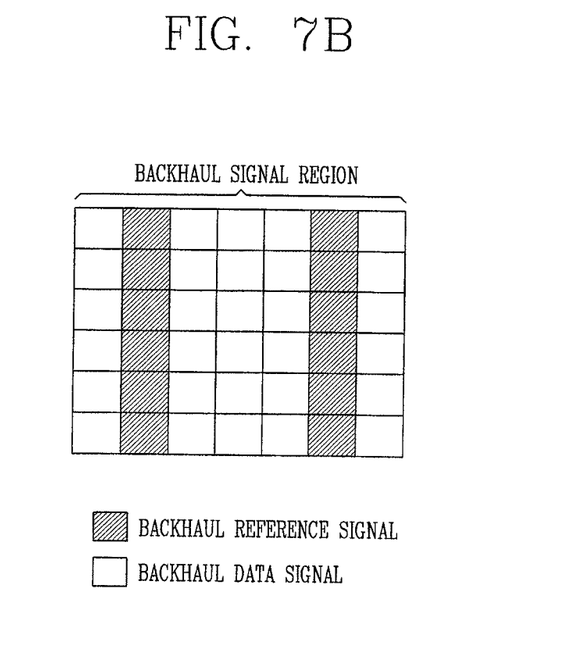

As shown in FIGS. 6A-6B, backhaul reference signals (RS) may be allocated to fixed positions on two edges of a backhaul signal region. As shown in FIGS. 7A-7B, the backhaul reference signals may be allocated to regions shifted toward the center from the two edges by the number of one or more OFD symbols. Likewise, referring to FIGS. 6A and 7A, the number of OFDM symbols which can be allocated to a backhaul signal region is 11. Referring to FIGS. 6B and 7B, the number of OFDM symbols which can be allocated to a backhaul signal region is 7. The reference signal may be a Common Reference Signal (CRS) for acquiring information on a channel status, or/and a Dedicated Reference Signal (DRS) for demodulating a transmission signal.

Figure 8A:
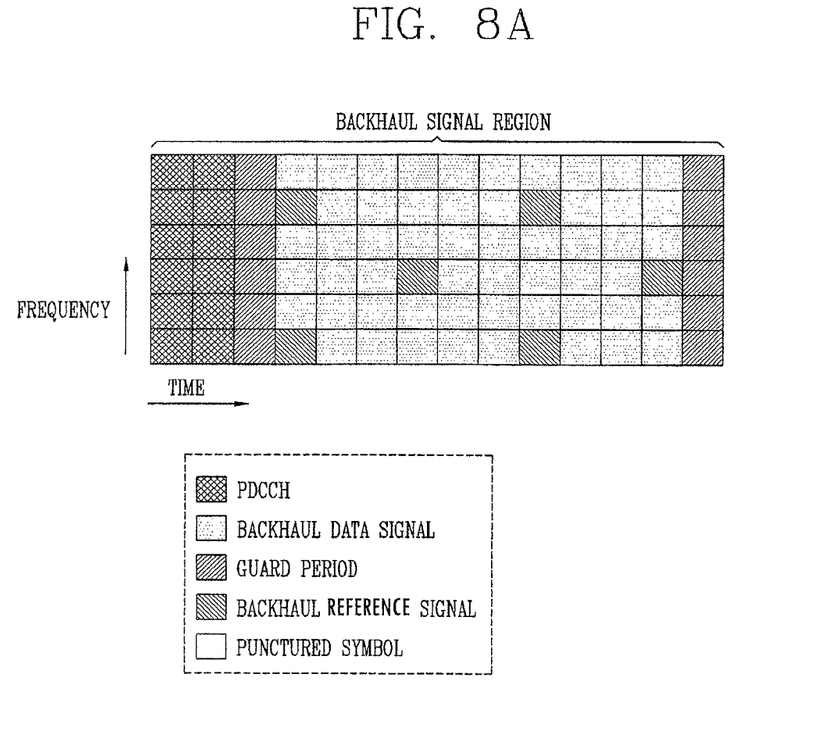
FIGS. 8A-8B are views illustrating a method for allocating an MBSFN subframe-based reference signal according to one embodiment of the present invention.
Figure 8B:
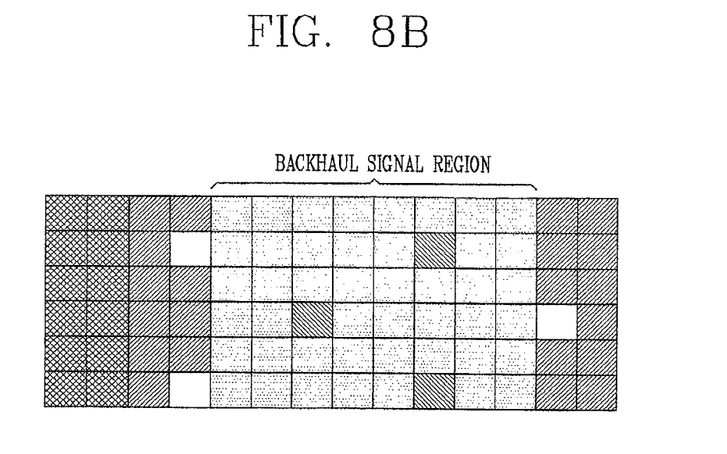

FIGS. 8A-8B are views illustrating a method for allocating an MBSFN subframe-based reference signal according to one embodiment of the present invention.

It is assumed that a transmitter transmits a reference signal to a reception side after a PDCCH has been transmitted. Then, the transmitter transmits only a reference signal disposed in a backhaul signal region, and punctures symbols to which reference signals disposed outside the backhaul signal region are allocated. FIG. 8A illustrates a method for allocating a reference signal when ten OFDM symbol transmission periods are allocated as a backhaul signal region, and FIG. 8B illustrates a method for allocating a reference signal when 8 OFDM symbol transmission periods are allocated as a backhaul signal region.

The transmitter determines symbols to which reference signals are allocated according to CRS, DRS or MBSFN RS. Then, the transmitter transmits, to the receiver, the symbols to which the reference signals have been allocated only within a backhaul signal region, and punctures the symbols corresponding to a guard period to which the reference signals have been allocated. Accordingly, the receiver receives and processes only the reference signals transmitted in the backhaul signal region. This may prevent performance degradation occurring when executing channel estimation, etc. Referring to FIG. 8B, the 4$^{th}$ OFDM symbol transmission period corresponds to a guard period, and thus a reference signal symbol allocated to the 4$^{th}$ OFDM symbol is punctured. The 13$^{th}$ OFDM symbol transmission period corresponds to a guard period, and thus a reference signal symbol allocated to the 13$^{th}$ OFDM symbol is punctured.

The reference signal may be a Common Reference Signal (CRS) for acquiring information on a channel status, or/and a Dedicated Reference Signal (DRS) for demodulating a transmission signal.

Figure 9A:
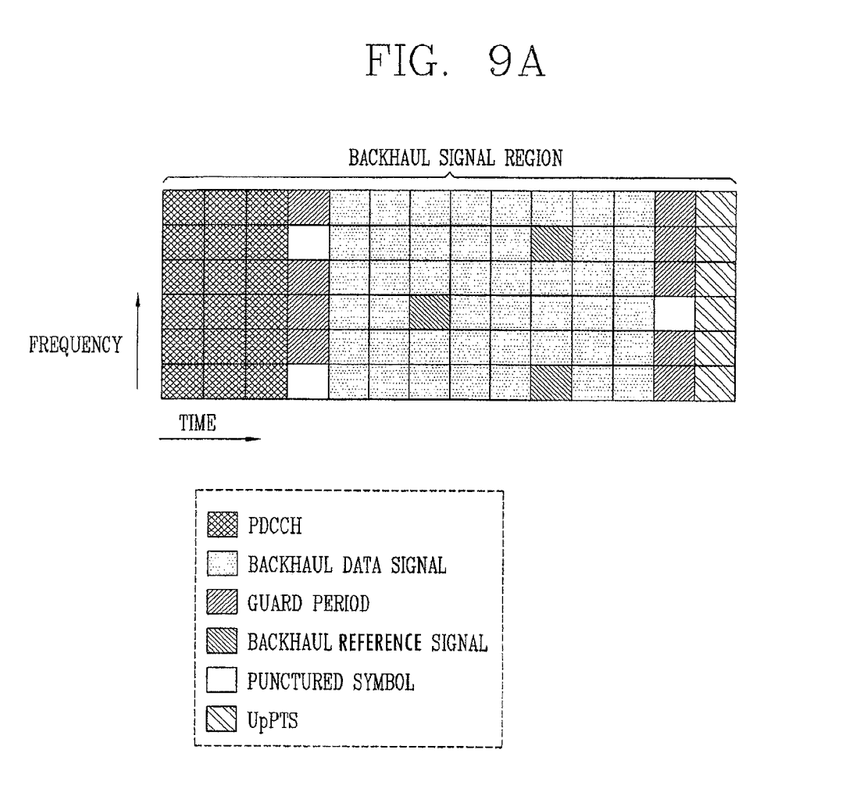
FIGS. 9A-9B are views illustrating a method for allocating a special subframe-based reference signal according to one embodiment of the present invention.
Figure 9B:
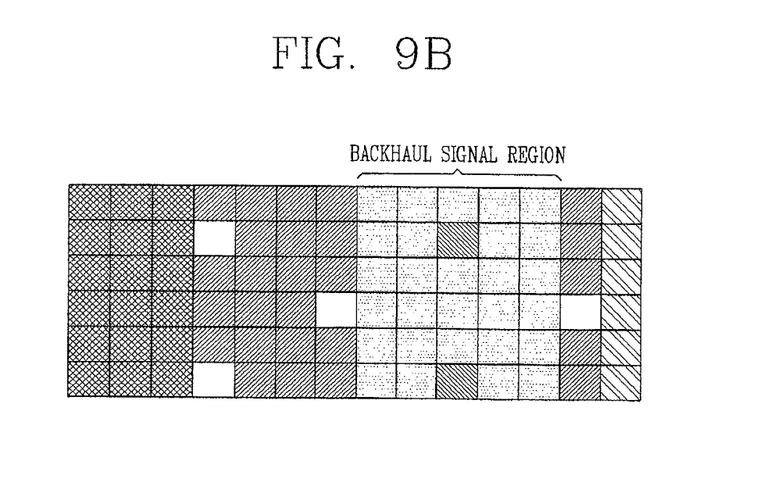

FIGS. 9A-9B are views illustrating a method for allocating a special subframe-based reference signal according to one embodiment of the present invention Like in the MBSFN subframe of FIGS. 8A-8B, in a special subframe of FIGS. 9A-9B, punctured are symbols corresponding to the guard band among symbols to which reference signals have been allocated. Accordingly, the receiver receives and processes only the reference signals transmitted in a backhaul signal region. This may prevent performance degradation occurring when executing channel estimation, etc.

The reference signal may be a Common Reference Signal (CRS) for acquiring information on a channel status, or/and a Dedicated Reference Signal (DRS) for demodulating a transmission signal.

Figure 10:
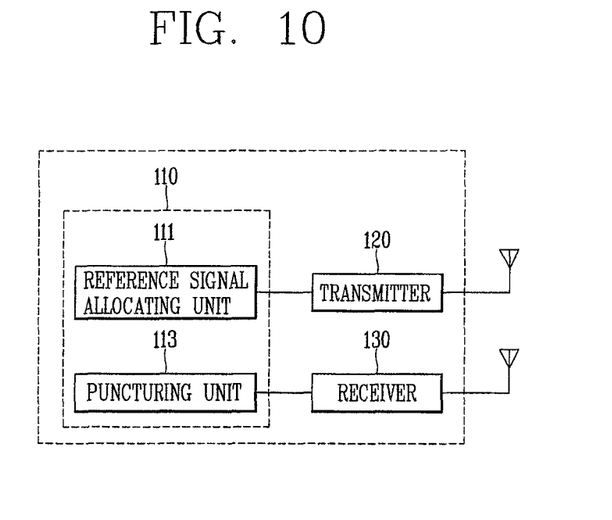
FIG. 10 is a block diagram schematically illustrating a configuration of an apparatus for transmitting data according to one embodiment of the present invention.

FIG. 10 is a block diagram schematically illustrating a configuration of an apparatus for transmitting data according to one embodiment of the present invention.

As shown in FIG. 10, the apparatus for transmitting data comprises a controller 110, a transmitter 120 and a receiver 130.

The controller 110 includes a reference signal allocating unit 111 and a puncturing unit 113. The reference signal allocating unit 111 is configured to set, as a guard band, the first predetermined number of symbol transmission slots of a data transmission period in a subframe resource element of a downlink channel constituted by a control signal transmission period to which a control signal is allocated and the data transmission period to which downlink data is allocated, and configured to allocate reference signals to symbols of the data transmission period. And, the puncturing unit 113 is configured to puncture the symbols corresponding to the guard band among the symbols to which said reference signals have been allocated. And, the transmitter 120 is configured to transmit signals to which said reference signals have been allocated to the receiver.

As aforementioned, the subframe may be an MBSFN subframe or a special subframe, and the reference signal may be one of CRS, DRS and MBSFN RS.

In addition, the above various embodiments may be implemented by using, computer software, hardware, or some combination thereof. For instance, the method of the present invention may be stored in a storage medium (e.g., internal memory, flash memory, hard disc, etc.), or may be implemented in codes or commands inside a software program that can be executed by a processor such as a microprocessor inside a UE.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for receiving a downlink reference signal by a relay node in a wireless access system, the method comprising:

receiving, from a base station, a configuration related to a resource region for base station-to-relay node transmission symbols and the downlink reference signal for demodulating the base station-to-relay node transmission symbols; and receiving the downlink reference signal on a preset region of the resource region for the base station-to-relay node transmission symbols according to the configuration, wherein the resource region for the base station-to-relay node transmission symbols is allocated to part of a downlink subframe configured in symbol units, wherein the downlink subframe is configured specifically for the base station-to-relay node transmission among several downlink subframes according to a Time Division Duplex (TDD) uplink-downlink configuration for a base station-to-user equipment transmission, and wherein the downlink reference signal is not located in the last one or more Orthogonal Frequency Division Multiplexing (OFDM) symbols within the downlink subframe when the resource region for base station-to-relay node transmission symbols is allocated to part of the downlink subframe configured in symbol units.

2. An apparatus for receiving a downlink reference signal in a wireless access system, the apparatus comprising:

a receiver; and a controller operably coupled to the receiver and configured to:

receive, via the receiver from a base station, a configuration related to a resource region for base station-to-relay node transmission symbols and the downlink reference signal for demodulating the base station-to-relay node transmission symbols, and receive, via the receiver, the downlink reference signal on a preset region of the resource region for the base station-to-relay node transmission symbols according to the configuration, wherein the controller is configured to allocate the resource region for the base station-to-relay node transmission symbols to part of a downlink subframe configured in symbol units, wherein the downlink subframe is configured specifically for the base station-to-relay node transmission among several downlink subframes according to a Time Division Duplex (TDD) uplink-downlink configuration for a base station-to-user equipment transmission, and wherein the downlink reference signal is not located in the last one or more Orthogonal Frequency Division Multiplexing (OFDM) symbols within the downlink subframe when the resource region for base station-to-relay node transmission symbols is allocated to part of the downlink subframe configured in symbol units.

* * * * *